United States Patent
Bove

(10) Patent No.: US 6,834,798 B2
(45) Date of Patent: Dec. 28, 2004

(54) METHOD FOR CREATING A FINGERPRINT IMAGE ON AN OPTICAL MEMORY CARD

(75) Inventor: John M. Bove, San Carlos, CA (US)

(73) Assignee: Drexler Technology Corporation, Mountain View, CA (US)

( * ) Notice: Subject to any disclaimer, the term of this patent is extended or adjusted under 35 U.S.C. 154(b) by 147 days.

(21) Appl. No.: 10/263,002

(22) Filed: Oct. 1, 2002

(65) Prior Publication Data

US 2004/0060989 A1 Apr. 1, 2004

(51) Int. Cl.$^7$ ................................. G06K 5/00
(52) U.S. Cl. ................. 235/382; 235/375; 235/454; 235/487
(58) Field of Search ................... 235/382, 375, 235/454, 487

(56) References Cited

U.S. PATENT DOCUMENTS

| | | | |
|---|---|---|---|
| 3,532,426 A | 10/1970 | Lemmond | 356/71 |
| 3,677,154 A | 7/1972 | Lee et al. | 95/1.1 |
| 3,704,949 A | 12/1972 | Thomas et al. | 356/71 |
| 3,781,113 A | 12/1973 | Thomas | 356/71 |
| 4,230,939 A | 10/1980 | de Bont et al. | 235/488 |
| 4,269,917 A | 5/1981 | Drexler et al. | 430/16 |
| 4,278,756 A | 7/1981 | Bouldin et al. | 430/414 |
| 4,278,758 A | 7/1981 | Drexler et al. | 430/616 |
| 4,284,716 A | 8/1981 | Drexler et al. | 430/510 |
| 4,298,684 A | 11/1981 | Bouldin et al. | 430/616 |
| 4,304,848 A | 12/1981 | Bouldin et al. | 430/401 |
| 4,312,938 A | 1/1982 | Drexler et al. | 430/496 |
| 4,314,260 A | 2/1982 | Drexler | 346/76 L |
| 4,363,870 A | 12/1982 | Bouldin | 430/510 |
| 4,383,024 A | 5/1983 | Bouldin | 430/271 |
| 4,396,701 A | 8/1983 | Bouldin | 430/271 |
| 4,455,083 A * | 6/1984 | Elmes | 356/71 |
| 4,544,181 A | 10/1985 | Maurer et al. | 283/74 |
| 4,544,267 A | 10/1985 | Schiller | 356/71 |
| 4,544,835 A | 10/1985 | Drexler | 235/487 |
| 4,680,459 A | 7/1987 | Drexler | 235/487 |
| 4,692,394 A | 9/1987 | Drexler | 430/140 |
| 4,745,268 A | 5/1988 | Drexler | 235/487 |
| 4,814,594 A | 3/1989 | Drexler | 235/487 |
| 4,835,376 A | 5/1989 | Drexler | 235/488 |
| 5,053,608 A | 10/1991 | Senanayake | 235/380 |
| 5,095,194 A | 3/1992 | Barbanell | 235/379 |
| 5,421,619 A | 6/1995 | Dyball | 283/86 |
| 5,457,747 A | 10/1995 | Drexler et al. | 380/24 |
| 5,509,083 A * | 4/1996 | Abtahi et al. | 382/124 |
| 5,623,552 A * | 4/1997 | Lane | 382/124 |
| 5,732,148 A * | 3/1998 | Keagy et al. | 382/124 |
| 5,815,252 A * | 9/1998 | Price-Francis | 356/71 |
| 5,815,598 A * | 9/1998 | Hara et al. | 382/211 |
| 5,818,956 A * | 10/1998 | Tuli | 382/126 |
| 5,974,162 A | 10/1999 | Metz et al. | 382/124 |
| 6,069,969 A * | 5/2000 | Keagy et al. | 382/124 |
| 6,182,892 B1 | 2/2001 | Angelo et al. | 235/380 |

OTHER PUBLICATIONS

Website printout, LaserCard Reader Writer, "LasrCard 780 Optical Card Drive", 2 pages.

* cited by examiner

*Primary Examiner*—Michael G. Lee
*Assistant Examiner*—Kimberly D. Nguyen
(74) *Attorney, Agent, or Firm*—Schneck & Schneck; Thomas Schneck; Gina McCarthy

(57) ABSTRACT

A method for imaging a fingerprint on an optical memory card having an upper transparent cover, a base and optical medium therebetween, wherein a cardholder imprints a fingerprint having a pattern of ridges and valleys on the upper cover of the card and a laser beam is scanned over the fingerprint. The laser beam is selectively transmitted by the fingerprint. The laser beam burns pits into optical medium areas corresponding to valleys of the fingerprint and is prevented from burning pits into optical medium areas corresponding to the ridges, thus producing a fingerprint image comprising light and dark areas in the optical medium corresponding to the pattern of ridges and valleys of the user's fingerprint.

16 Claims, 3 Drawing Sheets

METHOD FOR CREATING A FINGERPRINT IMAGE ON AN OPTICAL MEMORY CARD

FIELD OF THE INVENTION

The invention pertains to optical memory cards in general, and in particular to a method for creating a fingerprint identification means on an optical memory card.

BACKGROUND OF THE INVENTION

Identification cards used as credit cards, bank debit cards and the like are rapidly replacing cash as a preferred method for conducting commercial transactions. Consequently, forgery and fraudulent use of such cards is an increasing problem. Identification cards, which carry photographs, provide a fast and convenient means of identifying the authorized user. For instance, U.S. Pat. No. 4,745,268, assigned to the assignee of the present invention, describes a system in which wallet sized visually readable information, such as a face photograph, relating to a person is created on material disposed on one side of a wallet-sized card. However, fraudulent use of photographic identification cards may still occur. Such fraudulent use typically involves substitution of another photograph for that of the authorized user. Additionally, those attempting to fraudulently use the card may attempt to alter their appearance to appear more like the individual in the card identification photo. Also, the appearance of a cardholder may vary making it difficult to determine whether the card user is the rightful owner.

Fingerprints on identification cards are another means by which a card user's identity may be verified. Traditional fingerprint identification means include ink fingerprints left on a surface of the identification card. U.S. Pat. No. 5,053,608 describes such means. Unfortunately, a traditional ink fingerprint is subject to tampering. The original fingerprint may be washed off and replaced with the fingerprint of a user attempting to fraudulently use the card.

Another method for verifying the identification of the user of an identification card involves writing a fingerprint as digital data on an optical media of the identification card for later comparison to the user's fingerprint. Such a method provides a good means for verification. For instance, U.S. Pat. No. 4,835,376, assigned to the assignee of the present invention, describes a read and write system for personal information cards employing a laser. Unfortunately, in order to verify that the user of the card is the rightful owner of the card, an optical memory card reader/writer device is required to read any machine-readable data.

Therefore, it is an object of the present invention to provide an improved method for verifying the identification of a card user.

It is a further object of the invention to provide an improved method for creating a fingerprint identification means on an optical memory card.

SUMMARY OF THE INVENTION

The above objects are achieved by a method wherein an eye readable image of a fingerprint is laser burned onto an optical medium of an optical memory card after a cardholder leaves a fingerprint on an upper, transparent cover of the optical memory card. The fingerprint acts as a template for the image that is burned on the optical medium by refracting the laser beam at fingerprint ridges but not fingerprint valleys. After the fingerprint image has been burned on the card, the fingerprint left on the cover of the card may be removed by wiping or washing the upper cover of the card.

To create the eye readable image, the owner of the card, also called the cardholder, places his finger on the upper transparent cover of the optical memory card, the card having the optical medium disposed beneath the upper cover and above a base. When the user's finger is pressed onto the card cover, substances, such as oil naturally found on the owner's finger, remain on the cover in the pattern of a fingerprint having ridges and valleys. The pattern is a faithful reproduction of the pattern of ridges and valleys of the owner's finger. Optionally, the cardholder may moisten the finger to be pressed onto the card with an additional substance before pressing the finger on the card cover.

The card is placed in a reader/writer device, known in the art, to create the fingerprint image by darkening portions of the optical medium located beneath the transparent cover with a laser beam. The laser beam is continuously scanned over the fingerprint and passes through the fingerprint valleys disposed on the transparent cover of the card to the optical medium. The laser beam darkens areas of the optical medium that are disposed beneath areas of the card corresponding to the valleys of the fingerprint. Typically, the laser beam will pass through transparent substances. Although the ridges of the fingerprint are mostly transparent, they include surfaces angled relative to the surface of the card that refract the incoming laser beam to the extent that the light no longer focuses on the intended point on the optical medium. Thus, the ridges effectively prevent the laser beam from contacting the underlying optical medium and interfere with the darkening of the medium. Light and dark areas that correspond to the pattern of ridges and valleys of the cardholder's fingerprint are thus created. Thus, laser beam scanning and fingerprint image recording occur in a single operation.

The present invention is also advantageous in that the fingerprint image, resulting from the light and dark areas on the optical medium, may be viewed without any external apparatus. Further, the burned fingerprint image is embedded inside the card, just as data may be embedded inside the card. The optical medium is disposed behind the transparent cover, thus any attempt to fraudulently alter the optical medium will likely require removal of the cover and destruction of the card.

DETAILED DESCRIPTION OF THE INVENTION

Figure 1A:
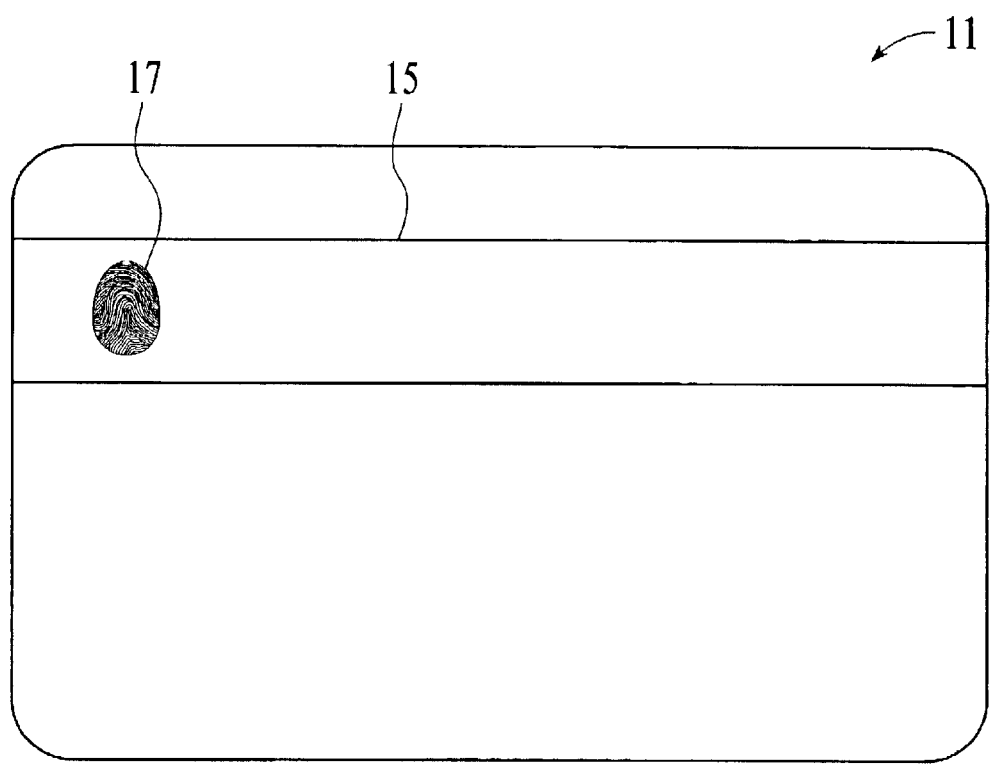
FIG. 1A is a top plan view of an optical memory card with a fingerprint image made according to the method of the present invention.
Figure 1B:
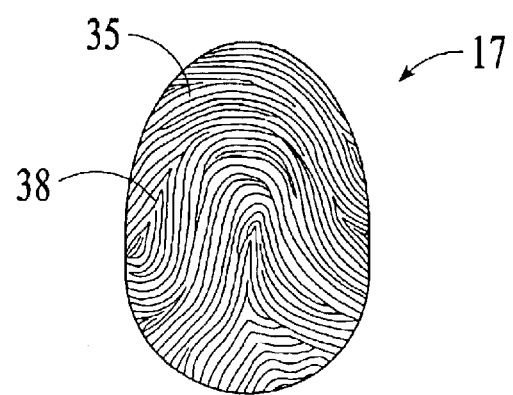
FIG. 1B is a magnified view of a portion of the fingerprint image of FIG. 1A.

With reference to FIGS. 1A and 1B, an optical memory card 11 is illustrated having a fingerprint image laser burned within an optical medium, in the form of, for example, optical medium strip 15, according to the method of the present invention. A magnified view of the laser written fingerprint image 17 on the laser recording material strip 15 is seen in FIG. 1B. The laser image 17, including a pattern of ridges and valleys of the fingerprint, corresponds to the fingerprint of the cardholder.

Figure 2:
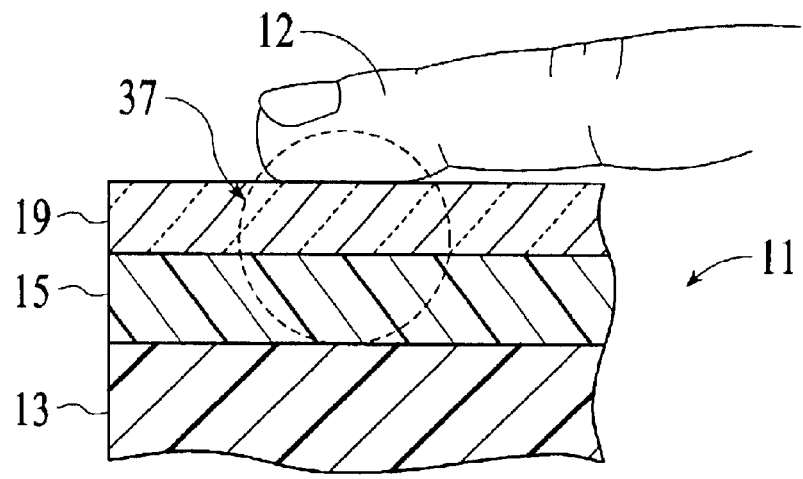
FIG. 2 is a partial side view of a finger and a partial cross sectional side view of an optical memory card.
Figure 3:
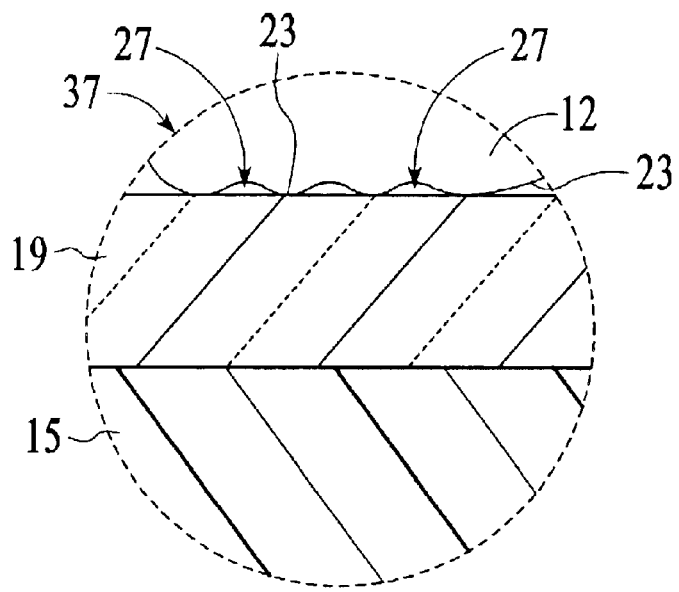
FIG. 3 is a representational magnified view of a portion of FIG. 2.
Figure 4:
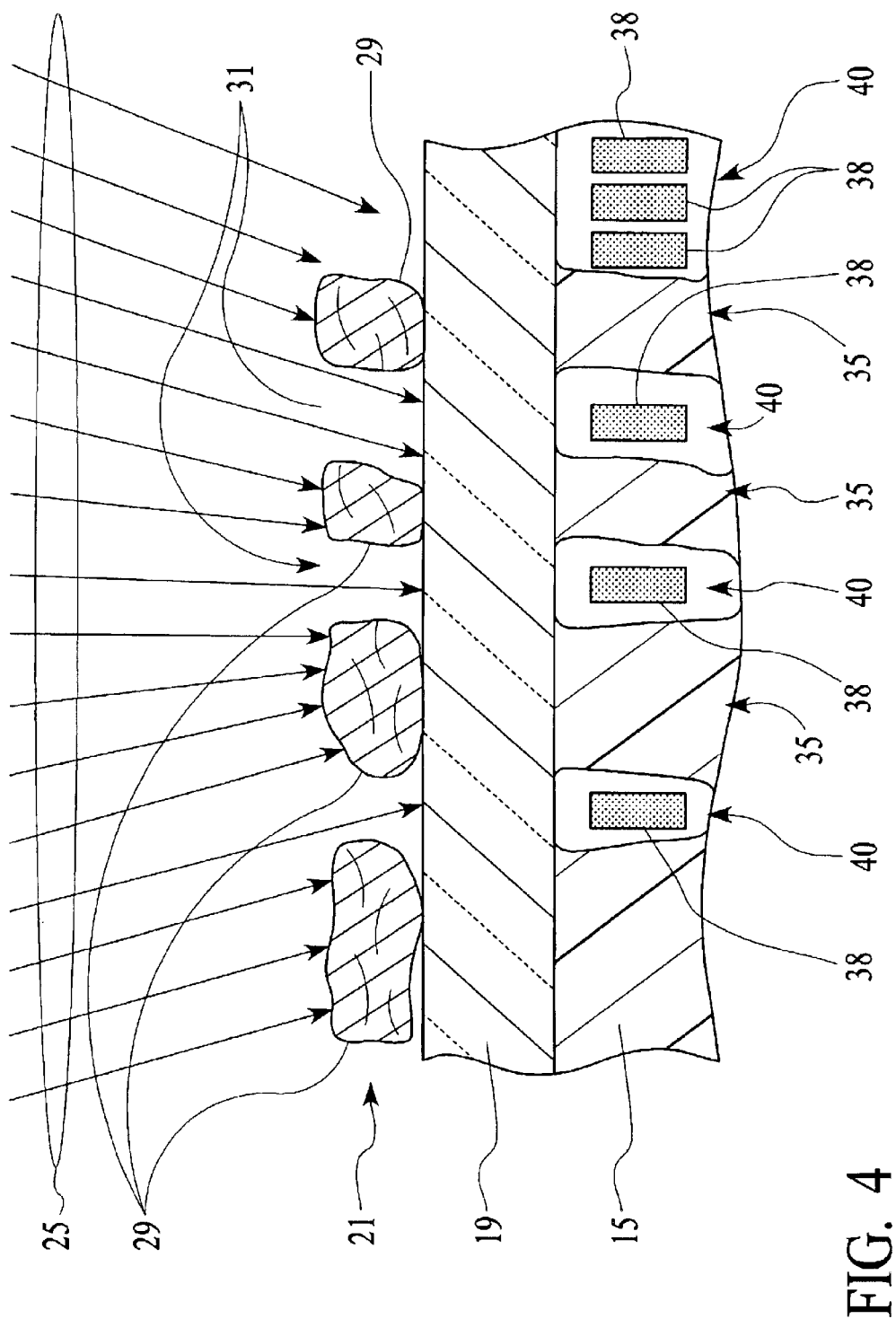
FIG. 4 is a cross sectional view of the card of FIG. 3 and a portion of a fingerprint.

In brief, the method of the present invention occurs as follows. With reference to FIGS. 2–4, a cardholder or owner places a finger 12 on an upper transparent cover 19 of the optical memory card 11 and leaves a fingerprint 21 on the cover 19, either with the natural oil of his finger 12 or with an alternative or additional substance. The user's finger 12 includes a pattern of ridges 23 and valleys 27, a print of which is left behind on the card cover 19 in the form of the fingerprint 21. A laser beam 25 is scanned over the fingerprint 21. The fingerprint selectively interferes with and selectively transmits the laser beam to the optical medium. Fingerprint ridges 29 prevent the laser beam from altering portions of the optical medium 15 beneath the card cover 19. Where there are no fingerprint ridges 29, but fingerprint valleys 31, the laser beam 25 is transmitted through to the optical medium 15 and darkens areas 40 of the medium 15 corresponding to the fingerprint valleys 31. The result is the eye-readable fingerprint image 33 (FIG. 1) burned into the optical medium 15 and available for verification of a card user's identity by comparison to the card user's fingerprint. Thus, in a single automatic operation or step, the fingerprint 21 is laser scanned and fingerprint image 17 is recorded.

With reference to FIG. 1A, the card 11 has a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 13 (FIG. 2) is a dielectric, usually a plastic material such as polyvinyl chloride or similar material. Polycarbonate plastic is preferred. The surface finish of the base should have low, specular reflectivity, preferably less than 10%. Base 13 (FIG. 2) carries the optical medium, in the form of, for example, strip 15.

The optical medium strip 15 is typically about 16 or 35 millimeters wide and extends the length of the card. Alternatively, the strip may have other sizes and orientations. The strip is relatively thin, approximately 100–500 microns, although this is not critical. The strip 15 may be applied to the card by any convenient method which achieves flatness. The high resolution laser recording optical medium which forms strip 15 may be any of the reflective recording materials which have been developed for use as direct read-after-write (DRAW) optical disks, so long as the materials can be formed on thin substrates. For example, the high resolution material described in U.S. Pat. No. 4,230,939 issued to de Bont, et al. teaches a thin metallic recording layer of reflective metals such as Bi, Te, Ind, Sn, Cu, Al, Pt, Au, Rh, As, Sb, Ge, Se, Ga. Materials which are preferred are those having high reflectivity and low melting point, particularly Cd, Sn, Tl, Ind, Bi and amalgams. Suspensions of reflective metal particles in organic colloids also form low melting temperature laser recording media. Silver is one such metal. Typical recording media are described in U.S. Pat. Nos. 4,314,260; 4,298,684; 4,284,716; 4,278,758; 4,278,756; 4,304,848; 4,312,938; 4,363,870; 4,396,701 and 4,383,024, all assigned to the assignee of the present invention. The optical recording medium DREXON®, owned by Drexler Technology Corporation, is typically used as the optical strip 15. The laser recording material which is selected should be compatible with the laser which is used for writing on it. Some materials are more sensitive than others at certain wavelengths. Good sensitivity to infrared light is preferred because infrared is affected least by scratches and dirt on the transparent laminating sheet.

The strip 15 may be adhered to the base 13 (FIG. 2) with an adhesive and covered by an upper transparent cover 19 which serves to keep strip 15 flat, as well as protecting the strip from dust and scratches. Cover 19 may be a thin, transparent plastic sheet laminating material or a coating, such as a transparent lacquer. The material is preferably made of polycarbonate plastic.

The opposite side of base 13 may have user identification indicia embossed on the surface of the card. Other indicia such as card expiration data, card number and the like may be optionally provided.

Referring back to FIGS. 2–4, the method of the present invention will be described in more detail. A card owner places his finger 12 on the upper transparent cover 19 of the optical memory card 11, as seen in FIG. 2 to form fingerprint 21 (FIG. 4). In FIG. 3, it is seen in dotted circle 37, which represents a magnified view of a corresponding portion 37 on FIG. 2, that the owner's finger 12 includes a pattern of ridges 23 and valleys 27 that are faithfully reproduced as the fingerprint 21 (FIG. 4) that is left on the cover 19 after the owner presses his finger 12 upon the cover 19. Note that FIG. 3 is merely representational in that it does not depict all ridges 23 and valleys 27 of the finger 12. A person's fingers naturally include oil, and/or other substances, which may be used to form the fingerprint 21 on the transparent cover 19. Alternatively, the card owner may moisten the finger to be pressed onto the cover 19 with an additional translucent or transparent substance that allows for formation of a fingerprint 21 on the cover 19. To form the fingerprint 21, the card owner may be required to carefully roll his finger 12 over the cover 19 to ensure that all ridges 23 and valleys 27 of the finger are accurately recorded. With reference to FIGS. 3 and 4, the fingerprint 21, formed from the pattern of the finger ridges 23 and valleys 27, has ridges 29 and valleys 31 that have a corresponding pattern of ridges and valleys as the finger 12 of the card owner.

Still referring to FIG. 4, after the fingerprint 21 has been imprinted on the cover 19, it is seen that laser beam 25 is directed at the fingerprint 21. The laser beam 25 may be continuously scanned over the fingerprint, without interruption. This is in contrast to the prior art method of forming laser data spots in an optical medium, which called for intermittently scanning a laser over the optical medium to form optical data spots, resulting in, for example, digital data. In another embodiment of the present invention, the laser beam 25 is pulsed instead of scanned continuously. This embodiment is further described below with regard to the LASERCARD 780™ read/write device. A scan of the laser beam, continuous or pulsed, results in the formation of the fingerprint image 17 (FIG. 1) of the present invention.

Also in the prior art, laser recordings were made by modulating the power of the laser to form the desired image. In the present invention, the laser writing power remains constant, when burning the fingerprint image 17 as discussed below.

The fingerprint 21 selectively transmits laser beam 25. The laser beam 25 alters or burns portions 40 of the strip 15 that are disposed beneath the fingerprint valleys 31 and does not alter or burn portions 35 of the strip 15 that are disposed beneath the fingerprint ridges 29. Fingerprint ridges 29, placed on the cover 19, are tall relative to their width. Although ridges 29 may be mostly transparent, and although, typically, transparent substances transmit the laser beam 25, the ridges 29 create surfaces at considerable angles relative to an upper surface of the card cover 19 that refract incoming laser beam 25 to the extent that light no longer focuses on the intended point on the strip 15. Refraction of the laser beam 25 typically does not occur in the fingerprint valleys 31, as the valleys comprise little or no oil (or other fingerprinting substance capable of imprinting the ridges as described above). Thus, the laser beam is able to focus on the intended point of the strip, to darken areas 40 of the strip 15 disposed beneath valleys 31. In one example, the laser beam burns or darkens a pit or series of pits 38 on portions 40 of the optical strip 15 corresponding to the position where the laser is directed. Pits may be, for example, 3×14 microns in size with a 1 micron space between pits. A row of pits comprises a pixel. Pits may have a pixel pitch of up to 25 microns square and still produce an accurate image of the fingerprint 21. Various pit and pixel sizes may be formed. The laser beam 25 burns a series of darkened pits 38 beneath the valleys 31 in areas 40 and fails to burn or darken areas 35 beneath the ridges 29, or fails to burn or darken areas 35 as much as areas 40 are darkened. The substance used to form the fingerprint 21 is transparent. If the fingerprint forming substance is imprinted on the cover 19 in an area corresponding to a valley 31, the laser beam 25 will transmit through the transparent or translucent substance to darken the corresponding portion 38 on the strip 15 as the substance within the valley 31 will not have as great a height to width ratio as the ridge 29. Thus, the present invention utilizes refractive properties of a substance, such as oil to create the fingerprint image 17.

The darkened portions 40, including pits 38 and non-darkened (or relatively non-darkened or light) portions 35 of the strip 15 formed by the laser beam 25, result in the fingerprint image 17 as seen in FIGS. 1A and 1B. The fingerprint image 17 is life size and eye-readable and, once it is formed, the fingerprint 21 on the card cover 19 may be removed at any time by wiping or washing. The fingerprint image 17 is tamper resistant. Attempts to alter the image 17, once laser burned onto the strip 15, would likely involve removal of the cover 19 and result in destruction of the card 11.

In contrast, prior art approaches to providing a fingerprint, such as providing an ink fingerprint on a card, are subject to tampering. Another prior art method for providing user identification involves writing a fingerprint as digital data on an optical media of the identification card and later comparing the data to a fingerprint of a card user. Such a method provides a good means for verification. However, in order to verify that the user of the card is the rightful owner of the card, an optical memory card reader/writer device is required to read the machine-readable data. In the present invention, a card reader/writer device is utilized to burn the laser image of the fingerprint 17 onto the strip 15, and may if desired, be used to read the laser image 17 of the fingerprint. However, the card reader/writer device is not required to read the fingerprint laser image 17.

The LASERCARD 780™ (not shown), is an example of a read/write device, manufactured by Drexler Technology Corporation, that may be used to record the fingerprint image 17 and, if desired, to read laser recordings from the card. The optical card drive of the LASERCARD 780™ is software controlled. The software programs the drive to burn pits onto the optical medium with a laser. The optical head of the optical card drive is disposed above the card. The optical memory card 11 moves back and forth underneath the head while the laser records spots on the card. With the LASERCARD 780™, the laser beam is pulsed in order that the drive of the device may maintain tracking on track guides. The drive cannot use the track guides to stay on track while the beam is at a power required for writing, so it reduces the power to the reading level for 1 out of every 15 microns scanned. Thus, the pulsed beam is writing about 93% of the time. The power of the laser when writing is approximately 35 mW and the wavelength of the laser light is approximately 830 nm. The burned pits 38, of portions 40, are approximately 3 microns×14 microns in size with about a 1 micron space between pits. Rows of pits may be spaced 12 microns apart with 5 pits per row. Thus, in this example, the approximate pixel pitch is 15 microns×12 microns. Additional read/write devices known in the art may also be used to record pits of desired sizes.

Additionally, in accord with the present invention, to verify that a card user is the original card owner, the fingerprint image 17 on the strip 15 of the card 11 is compared to a fingerprint provided by the user attempting to use the card 11. Upon a favorable comparison, the user is verified as the card owner and is granted access to utilize the card 11 for whatever purpose it may serve, assuming that any other verification criteria are met. Upon an unfavorable comparison, the user may be denied access to the benefits of the card 11. The card user, in one embodiment may provide a test fingerprint (not shown), in the form of an ink fingerprint, for example, on the card cover 19 for easy comparison to the imaged fingerprint 17.

The identity card 11 may include also information such as optical data and holographic images (not shown), if desired. For instance, in addition to the imaged fingerprint 17, a digital recording of the fingerprint may be created on the optical strip. When a card reader is available, the digital recording may be read and compared to a card user's fingerprint by using fingerprint comparison algorithms or by other means. Such additional information may be recorded on the card before or after a fingerprint image has been recorded. The fingerprint image will not interfere with recordation of additional data or images.

What is claimed is:

1. A method for imaging a fingerprint on an optical memory card having an upper transparent cover, a base and an optical medium therebetween, comprising:

placing a finger on said upper transparent cover and leaving a fingerprint, including a pattern of ridges and valleys, on said upper transparent cover;

removing said finger from said upper transparent cover; and directing a laser beam at said fingerprint wherein said laser beam alters optical medium portions beneath the fingerprint corresponding to said valleys and said laser is prevented from altering optical medium portions beneath the fingerprint corresponding to said ridges, said altered and non-altered portions forming an image of said fingerprint on said optical medium.

2. The method of claim 1 wherein altering said optical medium comprises burning a pit on said medium.

3. The method of claim 1 further comprising said ridges refracting said laser beam.

4. The method of claim 1 wherein said ridges refract said laser beam thus preventing said beam from altering said optical medium.

5. The method of claim 1 wherein said laser is directed at said fingerprint at a constant writing power.

6. The method of claim 1 wherein said altered portion of said optical medium is relatively darker than said non-altered portion.

7. The method of claim 1 wherein said fingerprint is imprinted with oil from said finger.

8. The method of claim 1 further comprising moistening a portion of said finger to be placed on said upper transparent cover prior to leaving said fingerprint on said transparent surface.

9. The method of claim 8 wherein said finger is moistened with oil.

10. The method of claim 1 further comprising removing said fingerprint from said upper transparent surface after said image of said fingerprint is produced.

11. The method of claim 1 wherein said image of said fingerprint is eye readable.

12. The method of claim 1 wherein placing said finger on said upper transparent cover includes rolling said finger on said upper transparent cover.

13. The method of claim 1 further comprising placing said optical memory card in a reader/writer unit before directing said beam at said fingerprint.

14. The method of claim 1 wherein said fingerprint image is tamper resistant.

15. The method of claim 1 wherein directing said laser beam and forming said fingerprint image occur in a single step.

16. The method of claim 1 further comprising a user imprinting a test fingerprint and comparing said test imprinted fingerprint with said fingerprint image to verify said user's identity.

* * * * *